United States Patent [19]
Tixier et al.

[11] Patent Number: 5,549,846
[45] Date of Patent: Aug. 27, 1996

[54] METHOD FOR THE CONTINUOUS PREPARATION OF VANADIUM PENTOXIDE GELS AND APPARATUS FOR IMPLEMENTING THE METHOD

[75] Inventors: Jean P. Tixier, Chalon-sur-Saone; Annie F. Legrand, Dracy-le-Fort, both of France

[73] Assignee: Eastman Kodak Company, Rochester, N.Y.

[21] Appl. No.: 162,039
[22] PCT Filed: Sep. 18, 1992
[86] PCT No.: PCT/EP92/02159
§ 371 Date: Dec. 3, 1993
§ 102(e) Date: Dec. 3, 1993
[87] PCT Pub. No.: WO93/06043
PCT Pub. Date: Apr. 1, 1993

[30] Foreign Application Priority Data

Sep. 27, 1991 [FR] France ................................. 91 12155

[51] Int. Cl.$^6$ ........................... B01J 13/00; C01G 31/02; C09K 3/16
[52] U.S. Cl. ................. 252/315.01; 260/DIG. 16
[58] Field of Search ................. 252/315.01, 315.1; 260/DIG. 16

[56] References Cited

U.S. PATENT DOCUMENTS 3,847,788  11/1974  Wallace .................................. 204/301

FOREIGN PATENT DOCUMENTS 2429252  1/1980  France .
2631628  1/1977  Germany .
62-30619  2/1987  Japan .
62-45006  2/1987  Japan .

*Primary Examiner*—Shean C. Wu
*Attorney, Agent, or Firm*—Robert A. Gerlach

[57] ABSTRACT

The invention relates to a method for the continuous preparation of vanadium pentoxide gel and an apparatus for implementing the method.

According to the present invention, the vanadium pentoxide is raised to a temperature at least 100° C. higher than its melting point; it is poured continuously into a quenching reactor 2 containing distilled water at ambient temperature; the gel obtained flows by overflowing to an ageing reactor 4, the contents of which are recirculated to the quenching reactor; the concentration of the gel contained in the ageing reactor 4 is measured continuously so as to adjust continuously the quantity of distilled water to be added to the quenching reactor 2; the contents of the ageing reactor are evacuated into a storage drum 9. Application to the manufacture of vanadium pentoxide for anti-static applications.

18 Claims, 1 Drawing Sheet

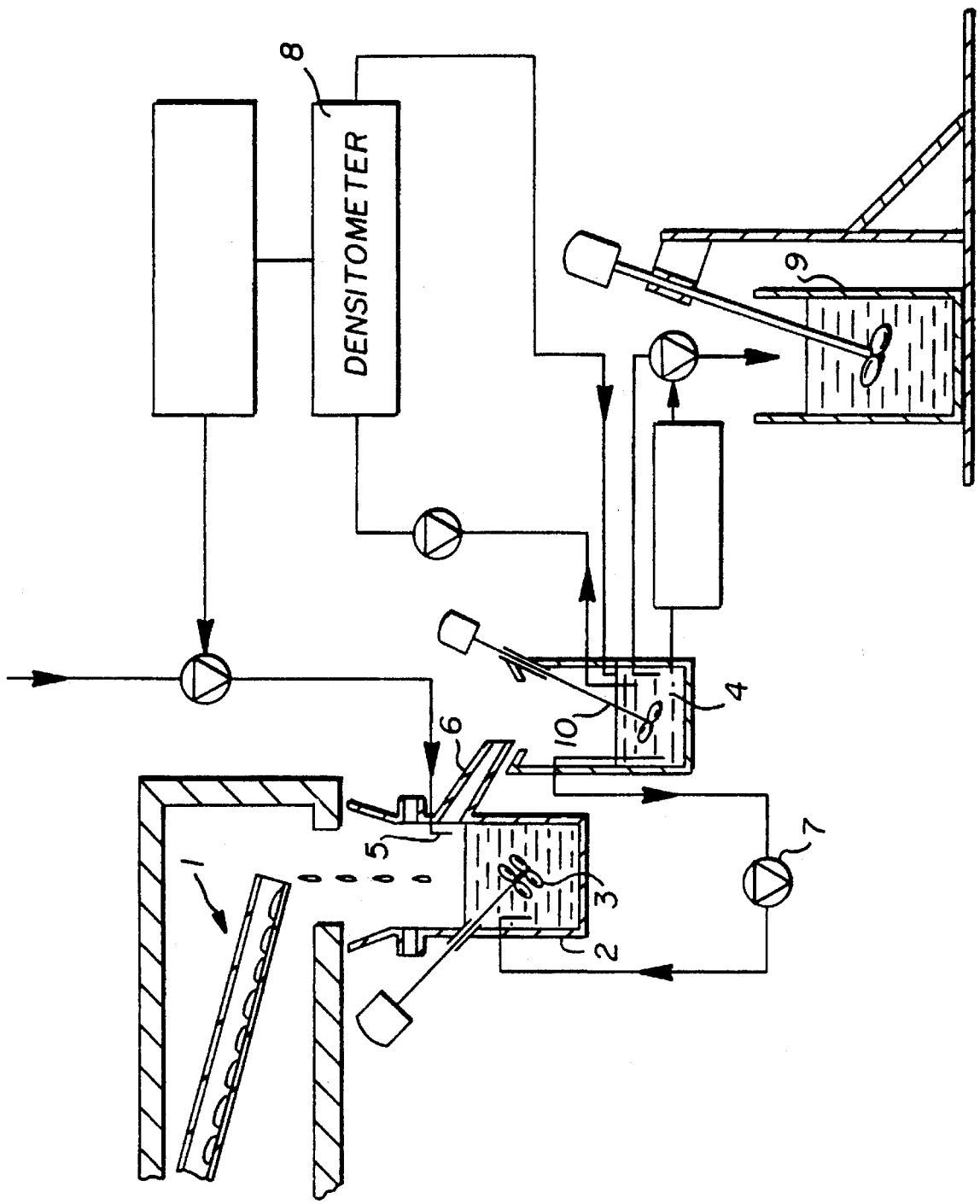

METHOD FOR THE CONTINUOUS PREPARATION OF VANADIUM PENTOXIDE GELS AND APPARATUS FOR IMPLEMENTING THE METHOD

The invention relates to a method for the continuous preparation of vanadium pentoxide gels used for anti-static applications. The invention also relates apparatus for implementing the method.

The oxide of vanadium $V_2O_5$ is an oxide which is particularly useful for obtaining compounds with satisfactory conductive properties for use in anti-static coatings.

It is known that it is possible to obtain vanadium oxide sols and that they have already been the subject of numerous studies. Thus, according to J. B. Donnet, in the *Journal de Chimie Physique* No 50, p.363 et seq (1953), these sols, which can be prepared by different methods (including the method of Erich Muller, which consists of spraying $V_2O_5$ at melting point into cold distilled water), contain particles whose chemical nature has given rise to a certain amount of controversy. The article by Erich Muller which appeared in Kolloid Z. 8 P.302 (1911) mentions that $V_2O_5$ is only very slightly soluble in water and that it is possible to obtain a sol, as indicated above, by spraying $V_2O_5$ maintained at melting point into cold distilled water. A Revcolevschi, in the lecture given on 13 Dec. 1973 to the Societe d'Encouragement pour l'Industrie Nationale, described a new method for obtaining amorphous structures of oxides or mixtures of oxides. This method, known as hyperquenching, consists of rapidly cooling a substance in the liquid or vapour state. For quenching from the liquid state to be efficacious, it is necessary for the rate of cooling of the material to be exceptionally high at the time of the transition from liquid to solid. This assumes an extremely high rate of heat exchange at this precise moment. It has been shown that the mechanism of heat exchange by conduction is the most effective method if the following conditions are met:

the substrate on which the quenching is carried out is an excellent conductor of heat;

the thermal contact is as perfect as possible;

the distance between the liquid and the substrate is as small as possible;

the time taken for passing from the liquid state to the solid state is as small as possible.

A Revcolevschi proposes different methods for obtaining this result. It has been possible to obtain amorphous structures by these methods since the rate of quenching has been sufficiently rapid to fix the structure of the liquid state in the solid state.

Up till now, vanadium pentoxide ($V_2O_5$) gels were produced by using a technique as described in the U.S. Pat. No. 4,203,769, namely in batches. According to the method described in this patent, the $V_2O_5$ is melted in a furnace incorporating a quartz tube. The $V_2O_5$ is optionally mixed with a doping agent such as silver. The furnace is raised to a temperature of approximately 1050° C. The molten oxide is then cast into a quenching reactor, under agitation, containing distilled water at 20° C. The outlet from the furnace is arranged at approximately 80 cm from the surface of the water in the quenching reactor. As soon as the desired concentration of $V_2O_5$ is obtained (measured by weighing), the process is stopped. The molten $V_2O_5$ remaining in the furnace is removed and the agitation of the gel in the quenching reactor is continued for approximately 30 minutes in order to obtain a uniform gel. Such a method has known drawbacks of batch manufacture, namely: the losses of molten oxide remaining in excess in the oven at the time the process is stopped (approximately 30% of the quantity of oxide); the stages during which the equipment is cleaned, requiring a considerable amount of time; non-uniform production from one batch to another. In addition, the yield of this type of method is relatively low. In fact, the maximum quantity of gel produced at 4% $V_2O_5$ is 90 kg in 8 hours.

Thus one of the objects of the present invention is to provide a method allowing the continuous production of a vanadium pentoxide gel, optionally mixed with a doping agent.

Another object is to provide a method of manufacturing vanadium pentoxide gel making it possible, with a high yield, to obtain a gel with a constant concentration of vanadium pentoxide.

Yet another object of the present invention is to provide an apparatus enabling vanadium pentoxide to be produced continuously with a constant concentration of vanadium pentoxide.

Other objects of the present invention will be clear during the following detailed description. The objects of the present invention are achieved by means of a method of preparing a vanadium pentoxide gel comprising the following steps:

a) the vanadium pentoxide is melted at a temperature which is at least 100° C. higher than its melting point;

b) the vanadium pentoxide is poured continuously into a quenching reactor containing distilled water so as to produce a gel, the vanadium pentoxide being poured under conditions such that the molten mass enters the distilled water at a temperature which is at least 50° C. higher than the melting point of vanadium pentoxide, distilled water being added to the said quenching reactor according to the desired concentration of vanadium pentoxide;

c) the gel obtained in the said quenching reactor runs off through overflowing into an ageing reactor, the contents of which are continuously recirculated in the quenching reactor, a continuous measurement of the concentration of the gel contained in the ageing reactor being carried out so as to adjust continuously the quantity of water to be added to the quenching reactor, the contents of the two reactors being agitated continuously;

d) continuously discharging the contents of the ageing reactor into a storage drum.

The method according to the present invention is implemented by means of apparatus for the continuous production of a vanadium pentoxide gel comprising:

a) means enabling the vanadium pentoxide to be raised to a temperature which is at least 100° C. higher than the melting point of vanadium pentoxide;

b) a quenching reactor maintained at ambient temperature, containing distilled water and in which the molten vanadium pentoxide is poured so as to form a gel, the molten vanadium pentoxide entering the quenching reactor at a temperature at least 50° C. higher than the melting point of vanadium pentoxide;

c) an ageing reactor into which the contents of the quenching reactor flow by overflowing;

d) means for agitating the contents of the two reactors;

e) means for continuously recirculating the contents of the ageing reactor in the quenching reactor;

f) means for continuously measuring the concentration of the vanadium pentoxide gel inside the ageing reactor;

g) means for adding distilled water to the quenching reactor according to the desired concentration of vanadium pentoxide gel;

h) means for continuously extracting the vanadium pentoxide gel from the ageing reactor.

BRIEF DESCRIPTION OF THE DRAWING

During the detailed description which follows, reference will be made to the single figure in the drawing showing an apparatus for implementing the method according to the invention.

FIG. 1 the device comprises a heating device 1 enabling the vanadium pentoxide ($V_2O_5$) to be melted.

DETAILED DESCRIPTION OF THE PREFERRED EMBODIMENTS

According to one embodiment this heating device 1 consists of a furnace incorporating a quartz tube. Alternatively, the heating is produced by means of an induction furnace or by using laser radiation. The $V_2O_5$ is raised to a temperature at least 100° C. higher than it's melting point under conditions such that the molten mass comes into contact with the contents of the quenching reactor (which will be described in more detail later) at a temperature at least approximately 50° C. higher than the melting point of $V_2O_5$. Preferably temperatures 100° C. to 400° C. higher than the melting point of $V_2O_5$ are used and, preferably again, 200° C. to 400° C. higher than the melting point of $V_2O_5$. According to a particular embodiment the $V2O5$ is raised to a temperature of approximately 1050° C.

Before being melted, the $V_2O_5$ is, according to one particular embodiment, mixed with an additional oxide or a chemical compound able, through thermal decomposition, to give an oxide. The additional compounds are preferably oxides chosen from amongst the oxides of alkaline metals, transition metals and rare earth metals. The compounds of alkaline metals, transition metals or rare earths used in association with the vanadium pentoxide are oxides, oxalates or carbonates.

Preferably lithium is used as alkaline metals, chromium, manganese, copper, zinc, niobium and silver as transition metals and neodymium, samarium, gadolinium, ytterbium and europium as rare earth metals. The compounds cited above represent less than 20% of the mixture obtained and preferably less than 10% of the mixture.

The $V_2O_5$ thus melted, and optionally mixed with auxiliary compounds, is poured continuously into a quenching reactor 2 initially containing distilled water at ambient temperature. Subsequently, by suitable means, arrangements are made to maintain the said quenching reactor at a temperature varying between 20° C. and 40° C.

The molten mixture is poured into the quenching reactor 2 from a height (with respect to the surface of the contents of the quenching reactor) varying between 15 cm and 2 m. According to one preferred embodiment, the molten mixture is poured into the quenching reactor 2 from a height of 80 cm. The contact of the molten mixture, under such temperature conditions, with the distilled water in the quenching reactor leads to the formation of a gel.

The contents of the reactor are maintained under strong agitation by means, for example, of a radial-action agitator 3 producing a high amount of shearing enabling the crystals to be broken rapidly. The agitation speed is preferably between 2000 and 8000 rev/min and, preferably again, of the order of 6000 rev/min. By way of example, the walls of the reactor can be made from polished stainless steel.

As the $V_2O_5$ is progressively added and the gel is discharged into an ageing reactor 4, which will be dealt with again in more detail later, distilled water is added, the quantity of which is adjusted according to the desired concentration of $V_2O_5$. Advantageously, the water is atomised by means of a circular head 5 positioned above the quenching reactor. Such an arrangement makes it possible in addition to clean the agitation device 3 continuously as well as the walls of the quenching reactor 2.

A constant level of gel is maintained inside the quenching reactor by causing the $V_2O_5$ gel to flow by overflowing into an ageing reactor 4 placed below the said quenching reactor 2, the gel flowing through a channel 6 which, advantageously, is made from PTFE. The large particles which form when the molten $V_2O_5$ comes into contact with the contents of the quenching reactor fall to the bottom of the quenching reactor 2 and remain there for a sufficient length of time (of the order of 5 to 10 min) to form a gel under the effect of the strong agitation, whilst the gel remains at the surface of the said quenching reactor.

The ageing reactor 4, which by way of example can be made from glass, is also maintained under strong agitation. Advantageously, the rate of agitation varies between 750 and 1500 rev/min and, preferably, is of the order of 800 rev/min.

The gel is caused to recirculate continuously from the ageing reactor into the quenching reactor according to a flow rate which allows a sufficient residence time for the gel in the ageing reactor. According to one embodiment, the volume of the ageing reactor is 6 litres, the recirculation rate 7 is 1 litre/min and the time of residence of the gel in the ageing reactor 4 is of the order of 5 min.

The quantity of distilled water added continuously to the quenching reactor 2 is adjusted according to the desired concentration of $V_2O_5$. To this end, according to a preferential embodiment, some of the contents of the ageing reactor 4 are continuously taken off and the density measured, the quantity of water added being dependent on the results supplied by the densitometer 8.

The final $V_2O_5$ gel is extracted continuously from the ageing reactor 4, the level in the said reactor being measured, by way of example, by conductimetry. The final $V2O5$ gel extracted from the ageing reactor, for example by pumping, is introduced into a storage drum 9 under agitation in order to allow ageing and homogenisation during the filling of the said storage drum.

The materials making up the reactors, the extraction and recirculation pipes and the densitometer are chosen so as to avoid any deposit of $V_2O_5$ gel. Advantageously, these are glass or PTFE. By way of example, Teflon R will be used.

The yield permitted by the implementation of the method according to the present invention is 200 kg/8 h, that is to say more than twice the yield obtained by the traditional methods. The losses of molten $V_2O_5$ have been reduced from 30% to 5%.

It should be noted that the ageing of the $V_2O_5$ gel is, for anti-static applications, a mandatory stage since the desired level of conductivity of the gel is obtained only 3 months after its preparation. Advantageously, this ageing period has been reduced by causing the gel to pass successively through two additional reactors (not shown) maintained at a temperature of 50°–80° C. and disposed between the ageing reactor 4 and the storage drum 9. Thus the ageing period is reduced by 3 to 4 times.

We claim:

1. A method of preparing a vanadium pentoxide gel comprising the following steps:

a) the vanadium pentoxide is melted at a temperature which is at least 100° C. higher than its melting point;

b) the vanadium pentoxide is poured continuously into a quenching reactor containing distilled water so as to produce a gel, the vanadium pentoxide being poured under conditions such that the molten mass enters the distilled water at a temperature at least 50° C. higher than the melting point of vanadium pentoxide, distilled water being added to the said quenching reactor according to the desired concentration of vanadium pentoxide;

c) the gel obtained in the said quenching reactor runs off through overflowing into an ageing reactor, the contents of which are continuously recirculated in the quenching reactor, a continuous measurement of the concentration of the gel contained in the ageing reactor being carried out so as to adjust continuously the quantity of distilled water to be added to the quenching reactor, the contents of the two reactors being agitated continuously; and d) continuously discharging the contents of the ageing reactor.

2. The method of claim 1, wherein the vanadium pentoxide is melted by means of a furnace incorporating a quartz tube.

3. The method of claim 1, wherein the vanadium pentoxide is raised to a temperature of about 1050° C.

4. The method of claim 1 wherein the quenching reactor is maintained at a temperature of between 20° C. and 40° C.

5. The method of claim 1 wherein the quenching reactor is agitated at a speed of between 2000 and 8000 rev/min.

6. The method of claim 1, wherein the ageing reactor is agitated at a speed of between 750 and 1500 rev/min.

7. The method of claim 1, wherein the molten mass is poured into the quenching reactor from a height of between 15 cm and 2 m.

8. The method of claim 1, wherein the molten mass is poured into the quenching reactor from a height of approximately 80 cm.

9. The method of claim 1, wherein, before being melted, the vanadium pentoxide is mixed with an additional oxide.

10. The method of claim 9, wherein the additional oxide is an oxide of an alkaline metal, a transition metal or a rare earth metal.

11. The method of claim 10, wherein the additional oxide is lithium oxide.

12. The method of claim 10 wherein the transition metal oxide is an oxide of chromium, manganese, copper, zinc, niobium or silver.

13. The method of claim 10 wherein the oxide of the rare earth metal is an oxide of neodymium, samarium, gadolinium, ytterbium or europium.

14. The method of claim 1 wherein before the contents are discharged, the vanadium pentoxide gel is caused to pass successively through two additional reactors maintained at a temperature varying between 50° C. and 80° C.

15. Apparatus for the continuous production of a vanadium pentoxide gel comprising:

a) means for enabling the vanadium pentoxide to be raised to a temperature at least 100° C. than the melting point of vanadium pentoxide;

b) a quenching reactor maintained at ambient temperature, containing distilled water into which the molten vanadium pentoxide is poured so as to form a gel, the molten vanadium pentoxide entering the quenching reactor at a temperature at least 50° C. higher than the melting point of vanadium pentoxide;

c) an ageing reactor into which the contents of the quenching reactor flow by overflowing;

d) means for agitating the contents of the two reactors;

e) means for continuously recirculating the contents of the ageing reactor in the quenching reactor;

f) means for continuously measuring the concentration of the vanadium pentoxide gel inside the ageing reactor;

g) means for adding distilled water to the quenching reactor according to the desired concentration of vanadium pentoxide gel;

h) means for continuously extracting the vanadium pentoxide gel from the ageing reactor.

16. Apparatus according to claim 15, characterised in that the means enabling the vanadium pentoxide to be heated comprises a furnace incorporating a quartz tube.

17. Apparatus according to claim 15, characterised in that the means for measuring the concentration of the gel comprise means for measuring the density of the said gel, and means for taking off some of the contents of the ageing reactor continuously.

18. Apparatus according to claim 15, characterised in that two additional reactors maintained at a temperature varying between 50° C. and 80° C. are disposed in a cascade after the ageing reactor.

\* \* \* \* \*